(12) United States Patent
Tamura

(10) Patent No.: US 9,413,841 B2
(45) Date of Patent: Aug. 9, 2016

(54) IMAGE PROCESSING SYSTEM, IMAGE PROCESSING METHOD, AND MEDIUM

(71) Applicant: CANON KABUSHIKI KAISHA, Tokyo (JP)

(72) Inventor: Makiya Tamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 103 days.

(21) Appl. No.: 14/486,302

(22) Filed: Sep. 15, 2014

(65) Prior Publication Data

US 2015/0086122 A1 Mar. 26, 2015

(30) Foreign Application Priority Data

Sep. 25, 2013 (JP) ................................ 2013-198409

(51) Int. Cl.
*G06K 9/64* (2006.01)
*H04L 29/08* (2006.01)
*G06K 9/20* (2006.01)
*H04N 1/00* (2006.01)

(52) U.S. Cl.
CPC ............ *H04L 67/2814* (2013.01); *H04L 67/10* (2013.01); *G06K 9/2054* (2013.01); *H04N 1/00* (2013.01)

(58) Field of Classification Search
None
See application file for complete search history.

(56) References Cited

U.S. PATENT DOCUMENTS

| 7,657,593 B2 * | 2/2010 | Sato ...................... G06F 3/1207 358/434 |
| 2003/0182143 A1 * | 9/2003 | Conrad ................... G06Q 30/02 705/26.1 |

FOREIGN PATENT DOCUMENTS

JP 2012-118863 A 6/2012

* cited by examiner

*Primary Examiner* — Daniel Mariam
(74) *Attorney, Agent, or Firm* — Carter, DeLuca, Farrell & Schmidt, LLP

(57) ABSTRACT

There is provided an image processing system for performing image processing on input image. The image processing system includes an input data determination unit configured to determine a device that has input image data that is input, an image processing unit configured to selectively perform image processing on the input image data based on the determination result by the input data determination unit, an image classification unit configured to classify input image data, and a redirect URL determination unit configured to determine a URL at the time of the next access by a user in accordance with the result of classification by the image classification unit. The image data on which the selective image processing is performed is subjected to processing in accordance with instructions from a display screen of the URL destination and the result of the processing is saved.

11 Claims, 16 Drawing Sheets

ESTIMATE SHEET

| | |
|---|---|
| COMPANY NAME | ABC INC. |
| ESTIMATED AMOUNT | 120,000 YEN |
| PERSON IN CHARGE | AYAMA BTARO |
| CONTACT TELEPHONE NUMBER | 03-1234-5678 |

APPROVAL APPLICATION ⟋1201

FIG.12

IMAGE PROCESSING SYSTEM, IMAGE PROCESSING METHOD, AND MEDIUM

BACKGROUND OF THE INVENTION

1. Field of the Invention

The present invention relates to an image processing system, an image processing method, and a medium. Specifically, the present invention relates to an image processing system for determining an input device from an image read by an image forming device, such as a camera, a scanner, and a copier, and switching user interfaces, an image processing method, and a medium.

2. Description of the Related Art

Conventionally, in the office environment, tasks in the workflow to make applications and to give approvals are performed by using a variety of documents, such as application forms, bills, receipts, order forms, and estimate sheets. Such documents each have a fixed format and the task in the workflow is specified for each format.

Further, as documents in the office environment, besides the previously-described documents whose format is fixed, there are documents to be shared with the persons concerned at the time of undertaking tasks, such as conference materials and proposal documents. Such a document does not have a fixed format and it is not possible to specify the task in which the document is used from the format.

In recent years, application forms of paper are electronized by using the scanning function of a multifunction peripheral, or by using a document scanner, or the like, and application is performed as a workflow in the electronic form. In this case, it is considered that image data is input to the system from a device, such as a multifunction peripheral having electronized an application form of paper and then, the workflow related to the image data is advanced by a PC etc.

In recent years, the mobile terminal, such as a smart phone and a tablet terminal, is provided with a camera, and it is made easy for the mobile terminal to perform photographing. Because of this, it is considered that also in the task in which a document is electronized by performing the previously-described scan, an image photographed by the mobile terminal is used. Further, it is also considered that the workflow is advanced from the mobile terminal, not from a PC.

On the other hand, as in Japanese Patent Laid-Open No. 2012-118863, there is a technique to perform character recognition for an image read by a scan and to display candidates of the operation to be performed next or setting values on a screen based on the result of character recognition.

SUMMARY OF THE INVENTION

In the case where an image acquired by a scanner, a multifunction peripheral, a camera, etc., is transmitted to an image processing system and then image processing is performed, it is necessary to switch the operations to transmit the image from the device having acquired the image in accordance with the task (to select different applications, to do different settings). The reason is that the image acquired from a device is an image having a format determined for each task. Consequently, it is necessary for a user to intentionally switch the operations for each task, resulting in the burden to the work of the user.

Further, in the case where the image processing for an image in the image processing system is specified in accordance with the task via the browser of a smart phone or a tablet terminal, the page to be accessed is different for each task. This can also be considered to be the burden to the work of the user because the user is forced to intentionally switch the operations for each task.

The present invention is an image processing system for performing image processing on an input image and includes an input data determination unit configured to analyze input image data and to determine a device having input the input image data, an image processing unit configured to selectively perform image processing on the input image data based on the determination result by the input data determination unit, an image classification unit configured to classify input image data by using the image data on which image processing is performed by the image processing unit, and a redirect URL determination unit configured to determine a URL at the time of the next access by a user in accordance with the result of the classification by the image classification unit, and the image data on which the selective image processing is performed is subjected to processing in accordance with instructions from a displayed screen of the URL destination determined by the redirect URL determination unit and the result of the processing is saved.

According to the present invention, it is possible to appropriately perform pre-processing for the image processing on an image acquired by a scanner, a multifunction peripheral, a camera, etc. Because of this, it is possible to switch pages to be accessed by a user for each task in accordance with the format of the image in the case where the image processing system is accessed via the browser of a smart phone or a tablet terminal. For example, in the case where a document, such as an application form, a bill, a receipt, an order format, and an estimate sheet, is input, an application screen for advancing the workflow is displayed. Further, for example, in the case where a document, such as a conference material and a proposal document, to be shared with the persons concerned at the time of undertaking a task, is input, a screen for setting a file format for sharing etc. is displayed. As described above, according to the present invention, it is possible to display a screen that a user desires to operate in accordance with an input image, and therefore, it is possible to improve convenience of a user in the workflow accompanying electronization of documents.

Further features of the present invention will become apparent from the following description of exemplary embodiments (with reference to the attached drawings).

BRIEF DESCRIPTION OF THE DRAWINGS

FIG. 12 is an estimate application screen displayed on the mobile terminal according to the first embodiment;

DESCRIPTION OF THE EMBODIMENTS

First Embodiment

Hereinafter, embodiments of the present invention are explained by using drawings. In the example below, by using a system as an example, in which screens to be displayed are switched in accordance with a scanned image in the case where a document is scanned and the system is accessed from a mobile terminal, processing to switch screens to be presented to a user based on image classification according to the present invention is explained.

<System Configuration>

Figure 1:
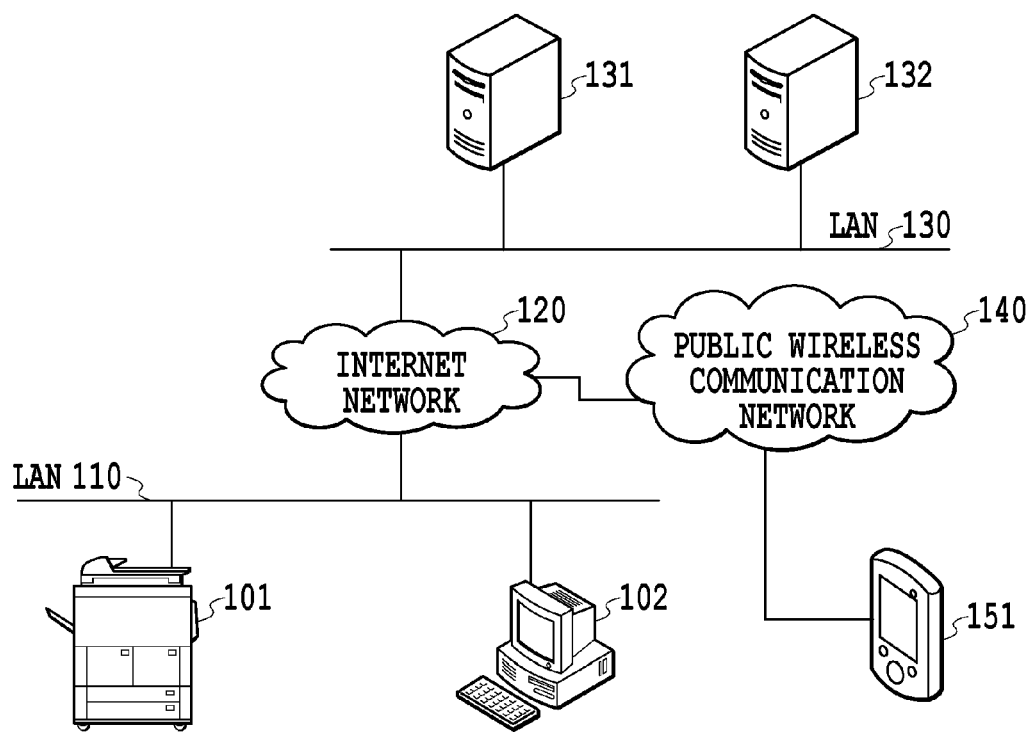
FIG. 1 is a diagram showing a configuration of the whole of a system according to a first embodiment.

FIG. 1 is a diagram showing a configuration of the whole of an image processing system to which the present invention can be applied.

As shown in FIG. 1, an image forming device 101 and a terminal 102, such as a PC, are connected to a LAN 110, such as Ethernet (registered trademark) and a wireless LAN. A cloud service server 131 and a cloud storage server 132 are connected to a LAN 130, such as Ethernet and a wireless LAN. Further, a mobile terminal 151 is connected to a public wireless communication network 140.

The LAN 110, the LAN 130, and the public wireless communication network 140 are connected to an Internet network 120, and therefore, the devices connected to each network of the LAN 110, the LAN 130, and the public wireless communication network 140 can communicate with one another.

In FIG. 1, the cloud service server 131 and the cloud storage server 132 are connected to the same LAN 130, but they may be connected to different LANs.

The image forming device 101 is a multifunction peripheral having a control unit, an operation unit, a scanner unit, and a printer unit. In the present embodiment, the image forming device 101 is used as a terminal that scans a document.

The cloud service server 131 is a server that provides a service to receive image data of a scanned document, to perform image processing specified by a user on the received image data, and to transmit the image data after the image processing to the cloud storage server 132.

The cloud storage server 132 is a server for keeping image data.

The mobile terminal 151 is a terminal device for specifying contents of the processing for an image and a transmission destination of the cloud storage server 132 as well as checking the image data of a scanned document. In the present embodiment, the mobile terminal 151 executes a client application for specifying the contents of the processing for an image and a transmission destination of the cloud storage server 132 by communicating with the cloud service server 131. Further, in the present embodiment, the client application is a Web browser. The operation to check the image data of a scanned document and the operation to specify the contents of the processing for an image and a transmission destination of the cloud storage server 132 by the mobile terminal 151 can also be performed by the terminal 102.

<Hardware Configuration of Image Forming Device 101>

Figure 2:
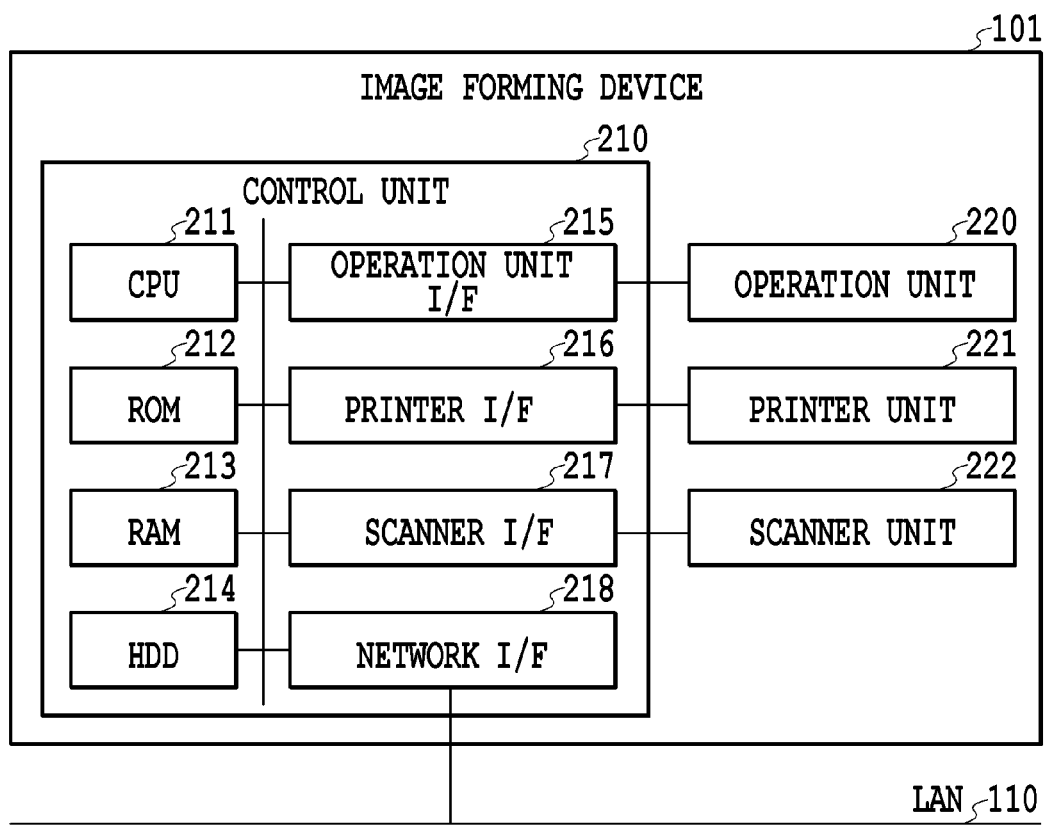
FIG. 2 is a block diagram showing a hardware configuration of an image forming device according to the first embodiment.

FIG. 2 is a block diagram showing a hardware configuration of the image forming device 101. The image forming device 101 includes a control unit 210, an operation unit 220, a printer unit 221, and a scanner unit 222.

The control unit 210 including a CPU 211 controls the operation of the whole of the image forming device 101. The CPU 211 performs various kinds of control, such as read control and transmission control, by reading control programs stored in a ROM 212. A RAM 213 is used as a main memory and a temporary storage area, such as a work area, of the CPU 211.

An HDD 214 stores image data and various kinds of programs, or various kinds of information tables. An operation unit I/F 215 connects the operation unit 220 and the control unit 210. The operation unit 220 includes a liquid crystal display unit having the touch panel function, a keyboard, etc.

A printer I/F 216 connects the printer unit 221 and the control unit 210. Image data to be printed in the printer unit 221 is transferred from the control unit 210 via the printer I/F 216 and printed on a recording medium, such as paper, in the printer unit 221.

A scanner I/F 217 connects the scanner unit 222 and the control unit 210. The scanner unit 222 reads the image on a document and generates image data, and inputs the generated image data to the control unit 210 via the scanner I/F 217.

A network I/F 218 connects the control unit 210 (image forming device 101) to the LAN 110. The network I/F 218 transmits image data and information to an external device on the LAN 110, receives various kinds of information from an external device on the LAN 110, etc. For example, in the case where the cloud service server 131 is connected to the LAN 110, the network I/F 218 transmits and receives image data and various kinds of information between the image forming device 101 and the cloud service server 131.

<Hardware Configuration of Cloud Service Server 131>

Figure 3:
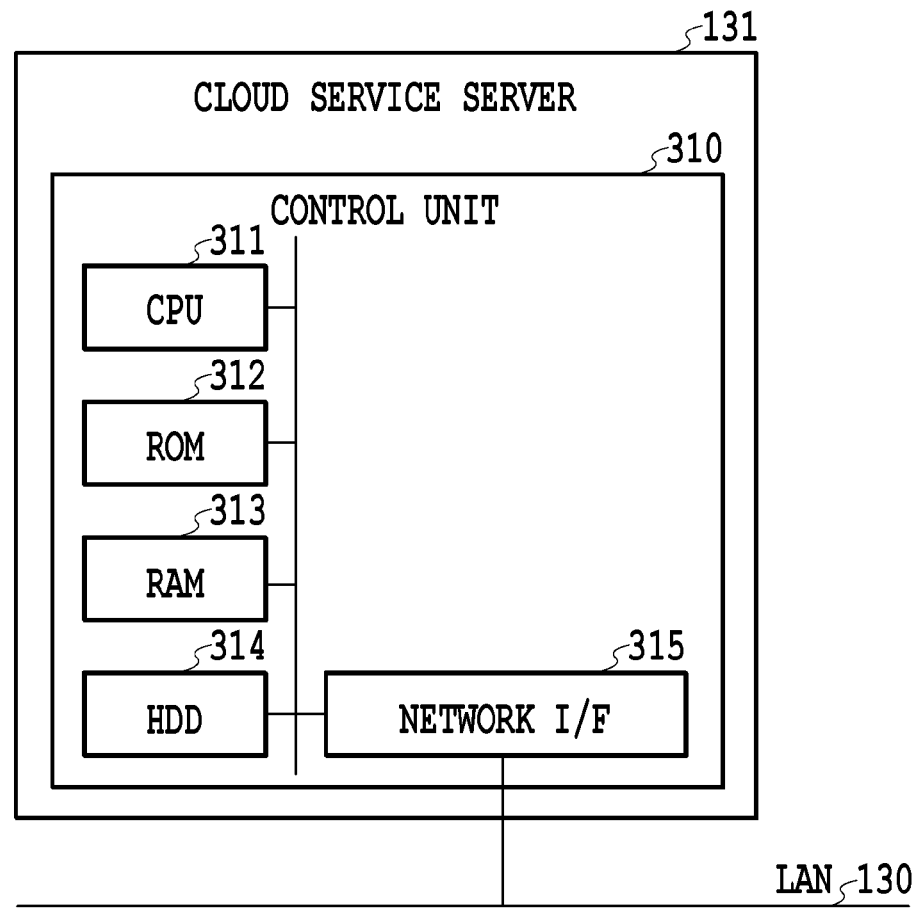
FIG. 3 is a block diagram showing a hardware configuration of a cloud service server according to the first embodiment.

FIG. 3 is a block diagram showing a hardware configuration of the cloud service server 131. A control unit 310 including a CPU 311 controls the operation of the whole of the cloud service server 131. The CPU 311 reads control programs stored in a ROM 312 and performs various kinds of control processing. A RAM 313 is used as a main memory and a temporary storage area, such as a work area, of the CPU 311. An HDD 314 stores image data and various kinds of programs, or various kinds of information tables, to be described later.

A network I/F 315 connects the control unit 310 (cloud service server 131) to the LAN 130. The network I/F 315 transmits and receives various kinds of information between the cloud service server 131 and another device on the LAN 130. The configuration of the cloud storage server 132 and the terminal 102 is the same as that of the cloud service server 131 explained by using FIG. 3, and therefore, explanation is omitted. However, the terminal 102 may have an operation unit in addition to the configuration in FIG. 3. In the case where the terminal 102 has an operation unit, the control unit 310 controls the control unit via an operation unit I/F.

<Hardware Configuration of Mobile Terminal 151>

Figure 4:
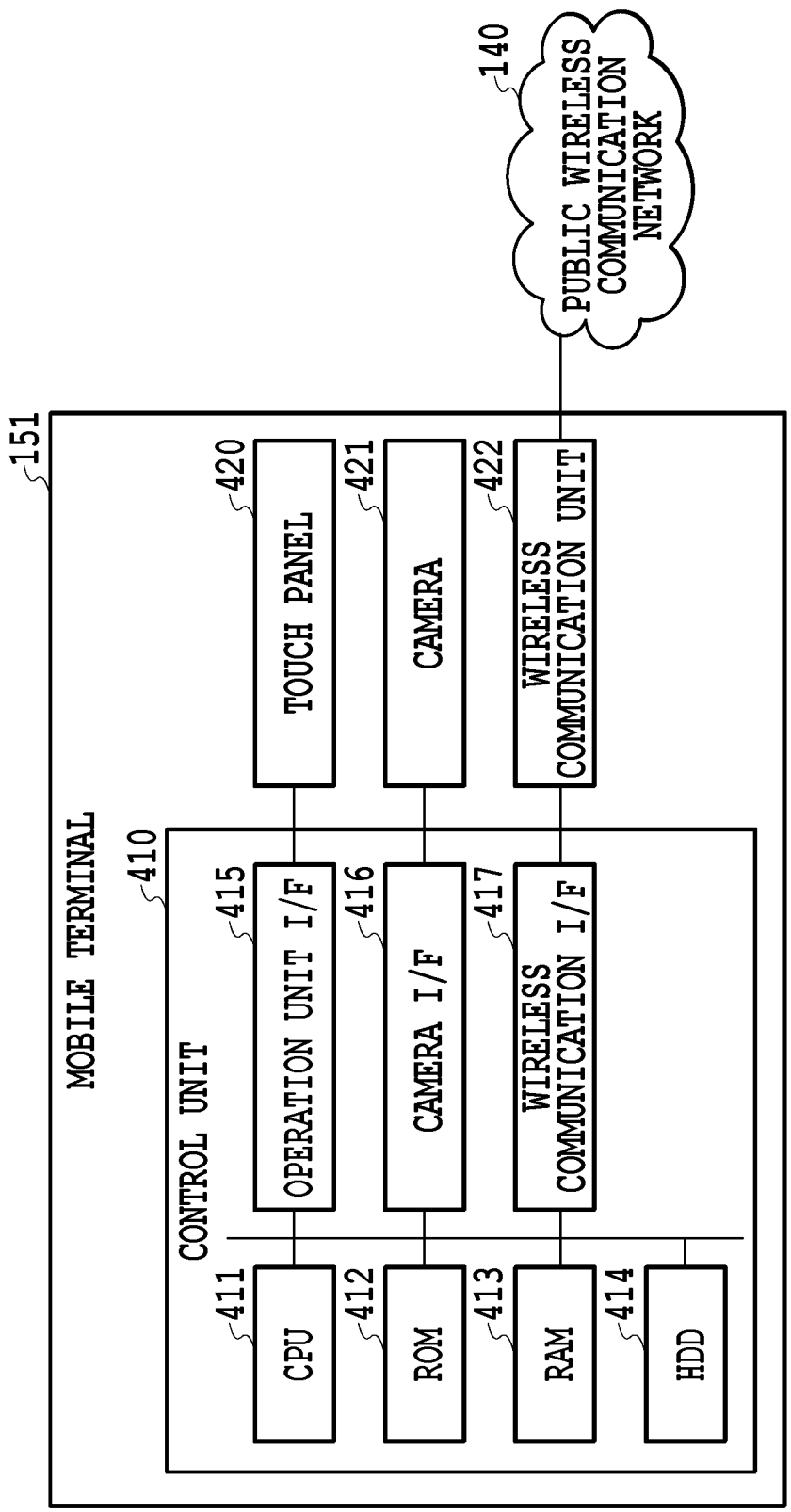
FIG. 4 is a block diagram showing a hardware configuration of a mobile terminal according to the first embodiment.

FIG. 4 is a block diagram showing a hardware configuration of the mobile terminal 151, such as a smart phone and a table terminal.

A control unit 410 including a CPU 411 controls the operation of the whole of the mobile terminal 151. The control unit 410 includes the CPU 411, a ROM 412, a RAM 413, an HDD 414, an operation unit I/F 415, a camera I/F 416, and a wireless communication I/F 417 and these units are connected via a system bus so as to be capable of communicating with one another.

The CPU 411 is a central processing unit and totally controls the mobile terminal 151 based on programs etc. stored in the ROM 412. Further, the CPU 411 is connected with a touch panel 420 via the operation unit I/F 415 and also connected with a camera 421 via the camera I/F 416 and communicates with the touch panel 420 and the camera 421 for control.

The ROM 412 is a nonvolatile flash memory and holds various kinds of programs and data. Further, the ROM 412 is used also as a storage area of an electronic file.

The RAM 413 is used as a work area at the time of execution of a program.

The operation unit I/F 415 is an interface for connecting the control unit 410 and the touch panel 420. It is possible for the touch panel 420 to process a number of simultaneously-touched points touched simultaneously, including data to be processes related to the pressure and magnitude of the touch, and/or the position of each touched point. Further, the touch panel 420 serves as an input device and also serves as a display device (output device) that produces a display for a user.

The wireless communication I/F 417 is an interface for connecting the control unit 410 and a wireless communication unit 422. The wireless communication unit 422 is hardware for performing wireless communication. The wireless communication unit 422 connects to the public wireless communication network 140. The wireless communication unit 422 transmits and receives various kinds of information between the mobile terminal 151 and another device on the public wireless communication network 140.

The camera 421 is hardware including a camera lens, a sensor, etc., for photographing an image.

<Software Configuration of Image Forming Device 101>

Figure 5:
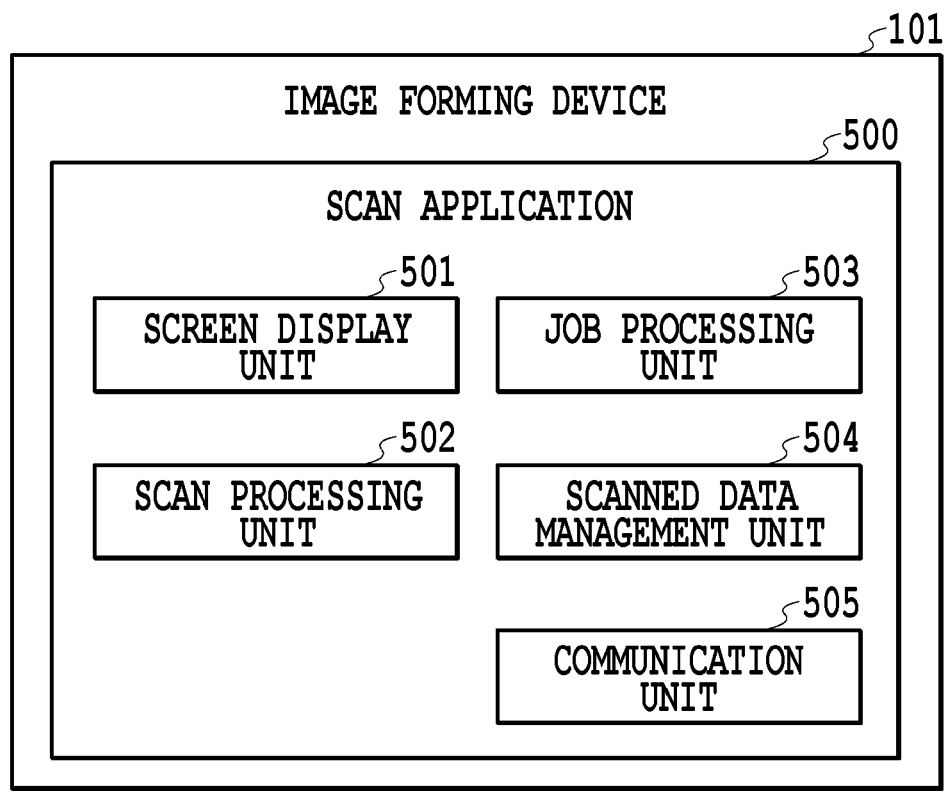
FIG. 5 is a diagram showing a software configuration of the image forming device according to the first embodiment.

FIG. 5 is a diagram showing a configuration of software modules of the image forming device 101 related to scan processing in the present embodiment. A scan application 500 including software modules 501 to 505 is stored in the HDD 214 of the image forming device 101 and executed by the CPU 211.

The scan application 500 is software for transmitting a scanned image to the cloud service server 131. The scan application 500 includes a screen display unit 501, a scan processing unit 502, a job processing unit 503, a scanned data management unit 504, and a communication unit 505.

The screen display unit 501 is a software module for displaying a screen on which to cause the operation unit 220 to perform scan processing.

The scan processing unit 502 is a software module for performing processing to read a document by driving the scanner unit 222 via the scanner I/F 217. The scan processing unit 502 receives image data from the scanner unit 222 and saves the received image data in the HDD 214.

The job processing unit 503 is a software module for converting image data saved in the HDD 214 into an image format, such as JPEG.

The scanned data management unit 504 is a software module for saving image data converted into an image format, such as JPEG, in the job processing unit 503 and managing it as a scanned image.

The communication unit 505 is a software module for transmitting and registering a scanned image saved in the HDD 214 to the cloud service server 131 via the network I/F 218.

<Software Configuration of Mobile Terminal 151>

Figure 6:
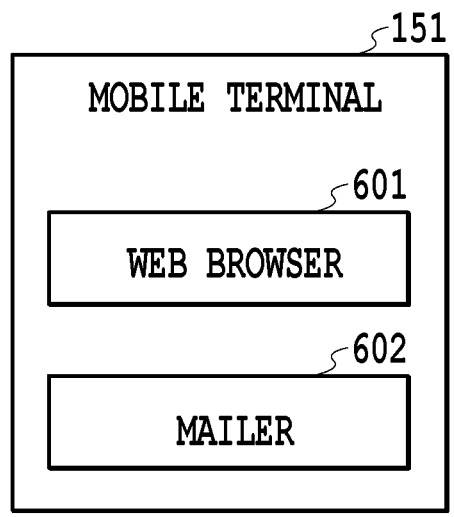
FIG. 6 is a diagram showing a software configuration of the mobile terminal according to the first embodiment.

FIG. 6 is a diagram showing a configuration of software modules of the mobile terminal 151 for checking a scanned image. Software modules 601 and 602 are stored in the ROM 412 of the mobile terminal 151 and executed by the CPU 411.

A Web browser 601 is a software module for displaying HTML data received as a result of the communication by the HTTP protocol performed between the mobile terminal 151 and the cloud service server 131 and receiving an input from a user.

A mailer 602 is a software module for receiving an electronic mail by communicating with an electronic mail server (not shown) connected to a LAN.

<Software Configuration of Cloud Service Server 131>

Figure 7:
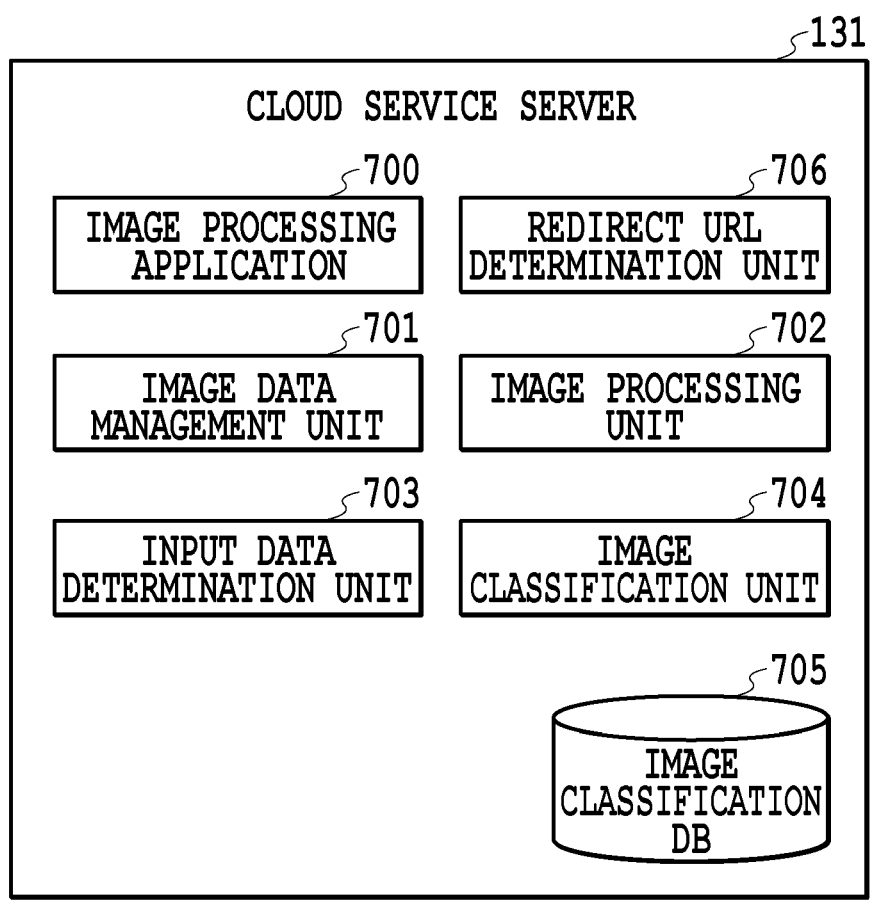
FIG. 7 is a diagram showing a software configuration of the cloud service server according to the first embodiment.

FIG. 7 is a diagram showing a configuration of software modules related to screen switch processing based on image processing of the cloud service server 131. These software modules are stored in the HDD 314 of the cloud service server 131 and executed by the CPU 311.

An image processing application 700 is a Web application for making public the Web service on the cloud service server 131 and performing image processing on an image sent via the Internet network 120 by using an image processing unit 702.

An image data management unit 701 is a software module for managing an intermediate product, which is a scanned image subjected to processing within the cloud service server 131, and the image processing result.

The image processing unit 702 is a software module for performing image processing on an image received by the image processing application 700.

An input data determination unit 703 is a software module for determining a device having input the image received by the image processing application 700. The input data determination unit 703 determines whether the image is an image formed as a result of reading by a scanner, such as the image forming device 101, or and an image formed as a result of photographing by a camera etc.

An image classification unit 704 is a software module for extracting an image having the highest degree of similarity with the image received by the image processing application 700 from the images registered in advance in an image classification database (image classification DB) 705 and classifying the input image into an appropriate image group.

A redirect URL determination unit 706 is a software module for determining a redirect URL at the time of receiving a request, such as a request to check the image received by the image processing application 700, based on the result of processing by the image classification unit 704. Here, it is assumed that the redirect URL determination unit 706 manages the kind of a document and its redirect URL as a pair.

<Software Configuration of Cloud Storage Server 132>

Figure 8:
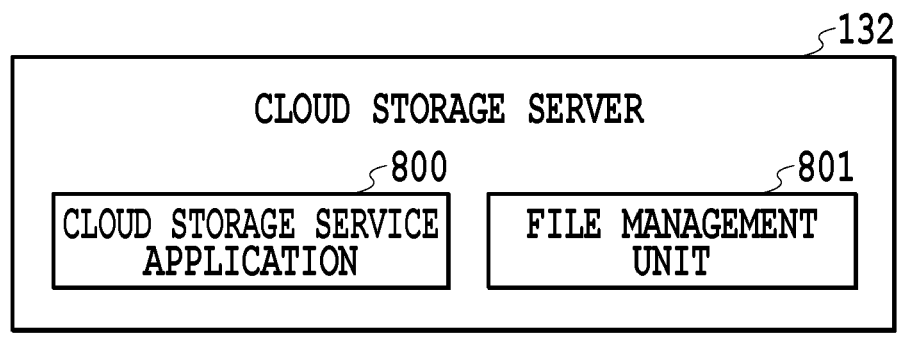
FIG. 8 is a diagram showing a software configuration of a cloud storage server according to the first embodiment.

FIG. 8 is a diagram showing a configuration of software modules related to the storage function of the cloud storage server 132. These software modules are stored in the HDD 314 of the cloud storage server 132 and executed by the CPU 311.

A cloud storage application 800 is a Web application for making public the Web service on the cloud storage server 132 and managing files, which are image data and document data, sent via the Internet network 120.

A file management unit 801 is a software module for receiving a file in response to instructions from the cloud storage application 800 and saving and managing the file in the HDD 314 via middleware, such as a file system and a DB.

<Processing Sequence>

Next, the processing sequence of a system for switching screens to be displayed in accordance with a scanned image in the case where a document is scanned and the system is accessed from a mobile terminal etc. according to the present embodiment is explained by using FIG. 9 to FIG. 12.

In the present embodiment, a case is explained where image data is acquired by scanning a document by a multifunction peripheral etc., but it may also be possible to acquire image data by photographing by a terminal having the camera function, such as a mobile terminal.

Figure 9:
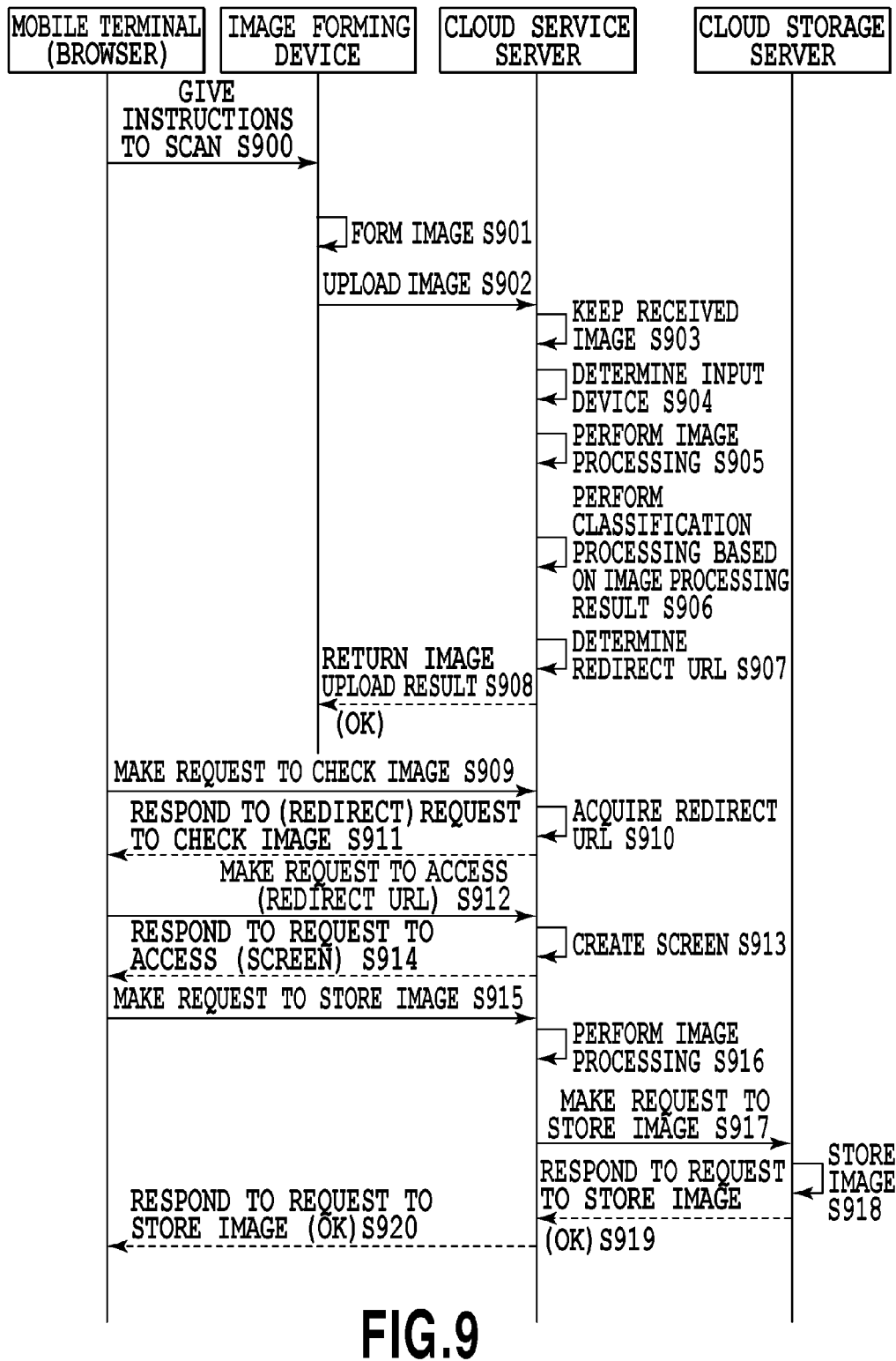
FIG. 9 is a sequence diagram of processing of the system according to the first embodiment.

FIG. 9 is a diagram showing the processing sequence of the system for switching screens to be displayed in accordance with a scanned image in the case where a document is scanned and the system is accessed from a mobile terminal etc. according to the present embodiment.

<Processing Sequence (Image Input)>

First, image input processing in the present embodiment is explained. In this section, a flow of processing is explained, from scanning an image by the image forming device 101, to transmitting the scanned image to the cloud service server 131, and to subsequent performing image processing to check the image in the cloud service server 131.

A user handles a variety of documents in his/her tasks. For example, such documents include documents to advance the workflow in the office, such as application forms, receipts, and bills, and documents to be shared with the persons concerned, such as proposal materials for business and conference materials. In the case of a document to advance the workflow, it is supposed that a user scans the document in order to associate the application processing system provided in the in-house system and the document. In the case of a document to be shared with the persons concerned, it is supposed that a user scans the document to be kept and shared in the document management system or in the file system.

First, at step S900, the image forming device 101 executes the scan application 500 for performing a scan by an input of a user through the operation unit 220. In the present embodiment, explanation is given on the assumption that a user has input user identification information through the operation unit 220 of the image forming device 101 and thus authentication has been performed.

After the scan application 500 activates, the screen display unit 501 displays a screen on which to prompt the start of a scan on the operation unit 220.

Figure 10:
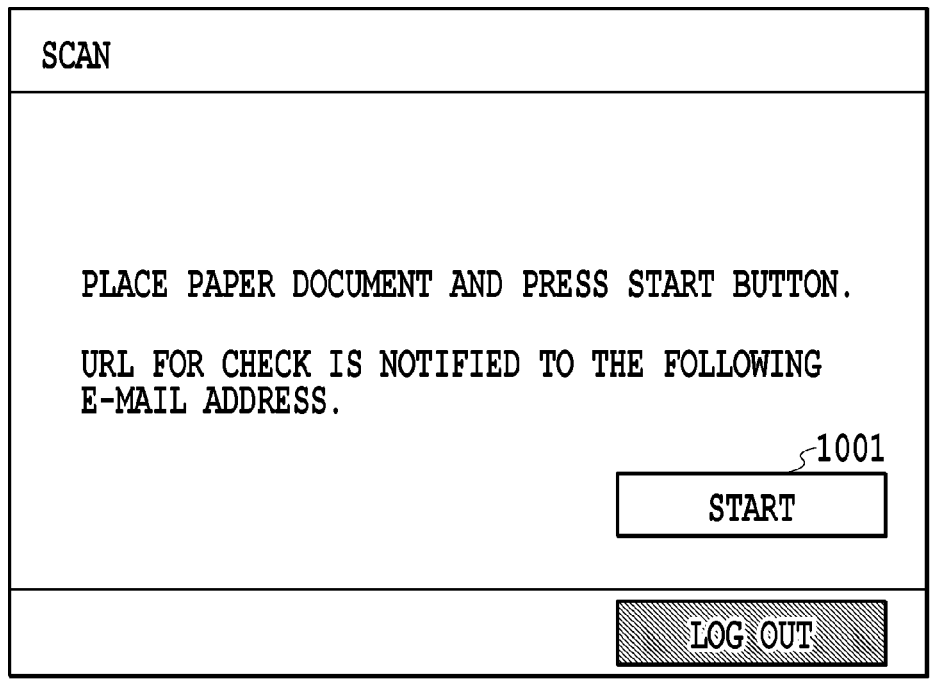
FIG. 10 is a screen to prompt the start of a scan displayed on an operation unit of the image forming device according to the first embodiment.

FIG. 10 is a screen that the screen display unit 501 displays on the operation unit 220. A GUI button 1001 is a GUI control for receiving the start of a scan from a user.

At step S901, upon receipt of pressing-down of the GUI button 1001, the screen display unit 501 gives instructions to the scan processing unit 502. The scan processing unit 502 having received the instructions from the screen display unit 501 acquires image data by driving the scanner unit 222, generates a scanned image by using the job processing unit 503, and keeps the scanned image by using the scanned data management unit 504.

At step S902, the communication unit 505 transmits the scanned image kept by the scanned data management unit 504 to the cloud service server 131.

At step S903, the image processing application 700 of the cloud service server 131 receives the image data transmitted from the image forming device 101 and then the image data management unit 701 keeps the received image data. The image data management unit 701 gives an ID to each piece of the image data and thus manages the image data.

At step S904, the input data determination unit 703 analyzes the image data that is kept and determines whether the device that has input the image data is the image forming device 101 including a scanner or a photographing device, such as a camera. For example, supposing that image data is transmitted in the JPEG format, it is considered to determine the device that has generated the image data by extracting Exif information included in the JPEG.

At step S905, the image processing unit 702 switches contents of the image processing to be performed based on the determination result of the input data determination unit 703 and then selectively performs the image processing. Specifically, in the case of an image input from a camera, the image processing unit 702 performs correction processing, such as trapezoid (keystone) correction. In the case of an input image from a multifunction peripheral, the image processing unit 702 performs processing, such as background removal, which is correction processing for images of a scanner. Further, there is image processing to create a preview image etc.

At step S906, the image classification unit 704 determines to which kind of document the input image data belongs by calculating a degree of similarity of the image data subjected to the processing by the image processing unit 702 with image data registered in advance in the image classification DB 705.

At step S907, the redirect URL determination unit 706 determines the URL at the time of the access based on the result of the processing by the image classification unit 704. In the present embodiment, image classification is performed at step S906 and the URL at the time of the access is determined at step S907, but the processing such as this may be performed at step S910, to be described later.

At step S908, the image processing application 700 returns a series of processing results by the cloud service server 131 to the image forming device 101 as an image upload result. At this time, the image processing application 700 includes the ID given to the received image data in the response. It may also be possible for the image processing application 700 to notify a user of the ID given to the image data by transmitting a mail.

<Processing Sequence (Image Check)>

Next, image check processing performed by using the mobile terminal 151 in the present embodiment is explained. In this section, a flow of processing is explained, from the access to the cloud service server 131 to check an image from the mobile terminal 151 until the image is kept in the cloud storage server 132.

At step S909, the mobile terminal 151 having received the user input via the Web browser 601 transmits an image check request to the cloud service server 131. At this time, it is assumed that information, such as an ID to specify the image, is included in the image check request. The image check request is the same not depending on the kind of the image or the input device of the image, and therefore, it is possible for a user to access by using the same URL at all times.

At step S910, the image processing application 700 of the cloud service server 131 receives the image check request from the mobile terminal 151 and transfers the image check request to the redirect URL determination unit 706. The redirect URL determination unit 706 specifies the image by referring to the information, such as the ID to specify the image, included in the transferred image check request. Next, the redirect URL determination unit 706 acquires the URL determined at step S907 for the specified image.

At step S911, the image processing application 700 generates a response (response to the image check request) including the URL acquired by the redirect URL determination unit 706 as a redirect URL and transmits the response to the mobile terminal 151.

At step S912, the Web browser 601 of the mobile terminal 151 refers to the redirect URL included in the response and transmits a request (access request) to the redirect URL destination.

At step S913, the image processing application 700 creates a screen (HTML) to be displayed on the Web browser 601 in response to the request.

Figure 11:
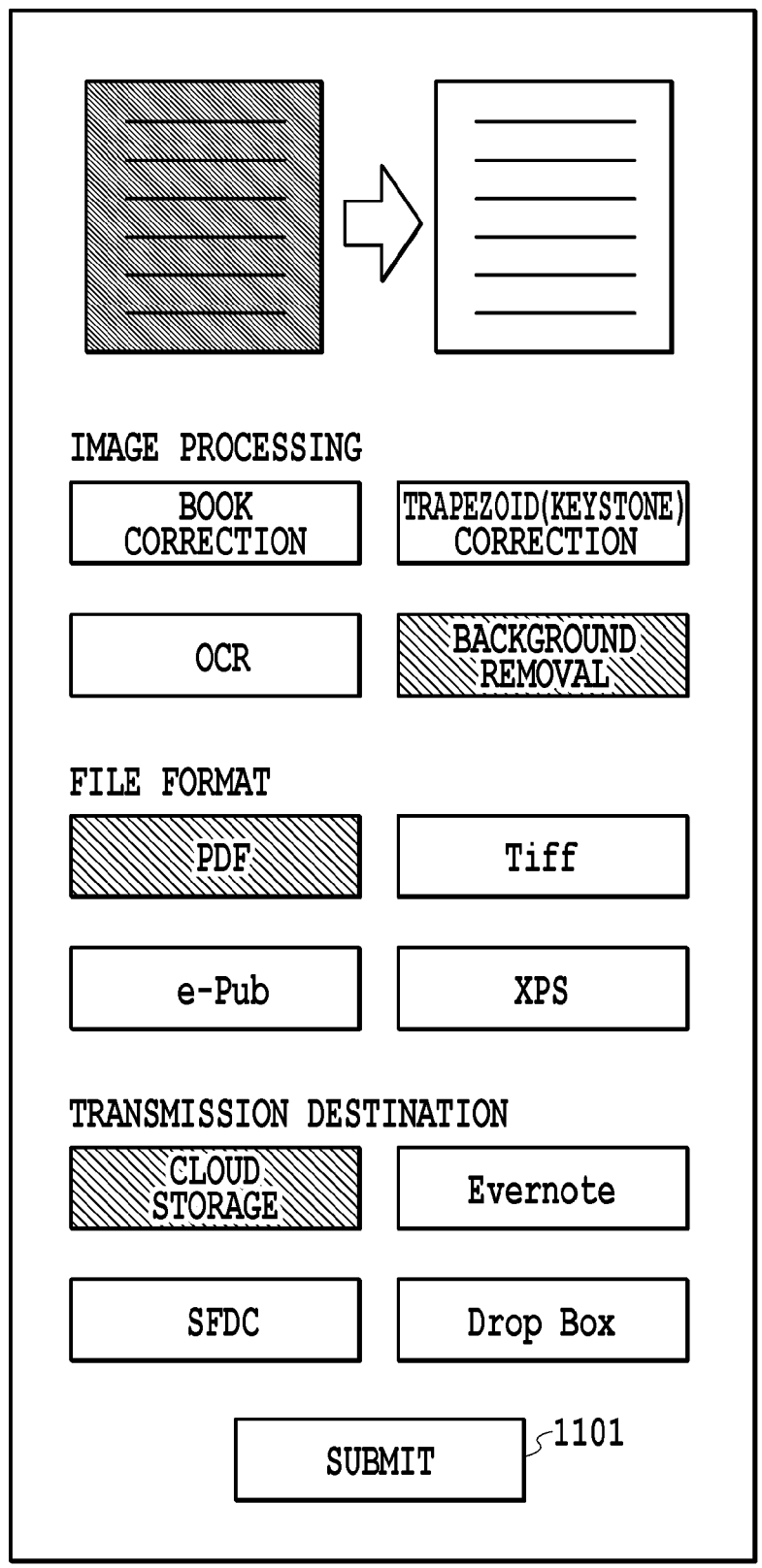
FIG. 11 is an image processing instruction screen displayed on the mobile terminal according to the first embodiment.

At step S914, the image processing application 700 responds to the mobile terminal 151 by including the created screen in the response (response to the access request). Next, the Web browser 601 having received the response from the image processing application 700 displays the screen. The screen displayed on the Web browser at this time is the screen as illustrated in FIG. 11 or FIG. 12 in accordance with the original image. For example, in the case where the original image is a document to be shared with other persons concerned, such as a proposal material for business and a conference material, the screen as in FIG. 11 is displayed. For example, in the case where the original image is an estimate sheet, which is a document to advance the workflow in the office, the screen as in FIG. 12 is displayed.

FIG. 11 illustrates a screen on which to specify image processing setting information on, such as which image processing is performed on the image acquired by the scan application 500 of the image forming device 101, in which file format the image processing result is saved, and to which the file is transmitted. Through the screen in FIG. 11, a selection by a user is input and then by the pressing-down of a GUI button 1101, the image processing setting information is transmitted to the image processing application 700. The example in FIG. 11 shows the state where the image processing setting information is specified so that background removal is performed as the image processing, the image processing result is saved in a PDF file, and the PDF file is transmitted to the cloud storage server 132.

FIG. 12 illustrates a screen on which to apply for approval to an estimate sheet. In the case where an estimate sheet is treated in the workflow, in general, the image processing setting information on, such as which image processing is performed, in which file format the image processing result is saved, and to which the file is transmitted, is defined in advance depending on the approval application system used by a user. Consequently, in the example in FIG. 12, the screen is configured so that the image processing setting information defined in advance is transmitted to the image processing application 700 as hidden parameters in the case where a user presses down a GUI button 1201 after checking the screen.

In the present embodiment, explanation is given on the supposition that a user checks an image from the mobile terminal 151, but it may also be possible for a user to check an image from the terminal 102 etc. in place of the mobile terminal 151.

At step S915, the user's operation on the screen illustrated in FIG. 11 or FIG. 12 displayed on the Web browser 601 is performed. Next, the mobile terminal 151 transmits an image storage request including image processing setting information from the Web browser 601 to the image processing application 700.

At step S916, the image processing application 700 having received the image storage request acquires the image processing setting information included in the image storage request and requests the image processing unit 702 to perform the specified image processing. The image processing unit 702 performs image processing, such as background removal, based on the image processing setting information and carries out file format conversion of the resultant image data into a PDF etc.

At step S917, the image processing application 700 transmits the file after the image processing generated in the image processing unit 702 to the transmission destination described in the image processing setting information. In the present embodiment, the image processing application 700 transmits the image storage request to the cloud storage server 132 after including the file after the image processing in the image storage request.

At step S918, the cloud storage application 800 of the cloud storage server 132, which has received the image storage request from the image processing application 700, acquires the file after the image processing included in the image storage request. Then, the file management unit 801 stores the acquired file after the image processing in the HDD 314 of the cloud storage server 132.

At step S919, the cloud storage application 800 returns the storage result of the file after the image processing at step S916 to the image processing application 700 by including the result in the response to the image storage request. Then, the cloud service server 131 receives the response to the image storage request from the cloud storage application 800.

At step S920, the image processing application 700 of the cloud service server 131 responds to the Web browser 601 by returning the response to the image storage request.

The above is the processing sequence of the system for switching screens in accordance with a scanned image in the case where a document is scanned and the system is accessed from the mobile terminal etc.

<Flowchart of Processing Performed by Cloud Service Server 131>

Figure 13:
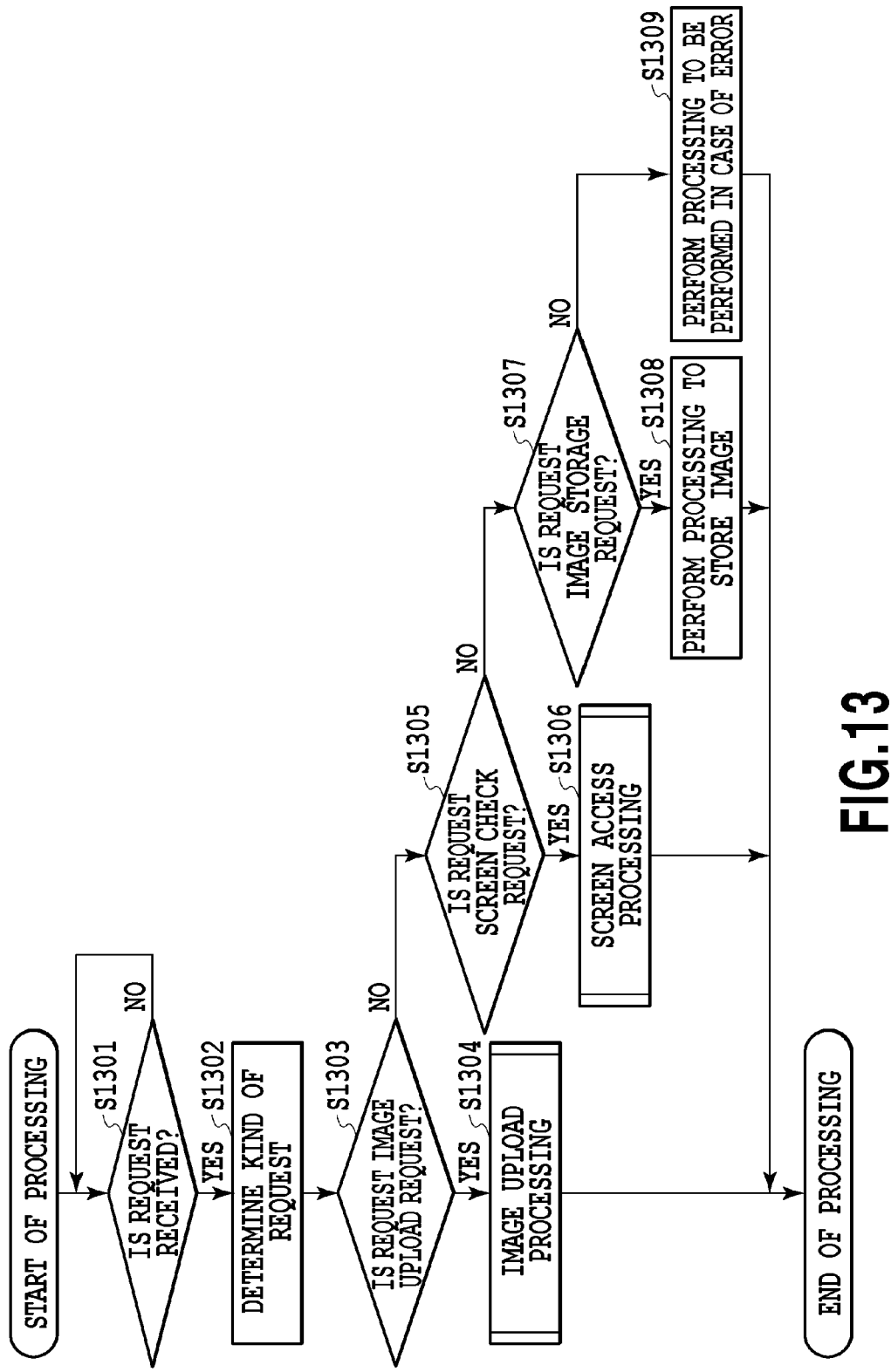
FIG. 13 is a flowchart of processing for a received request performed by the cloud service server according to the first embodiment.
Figure 14:
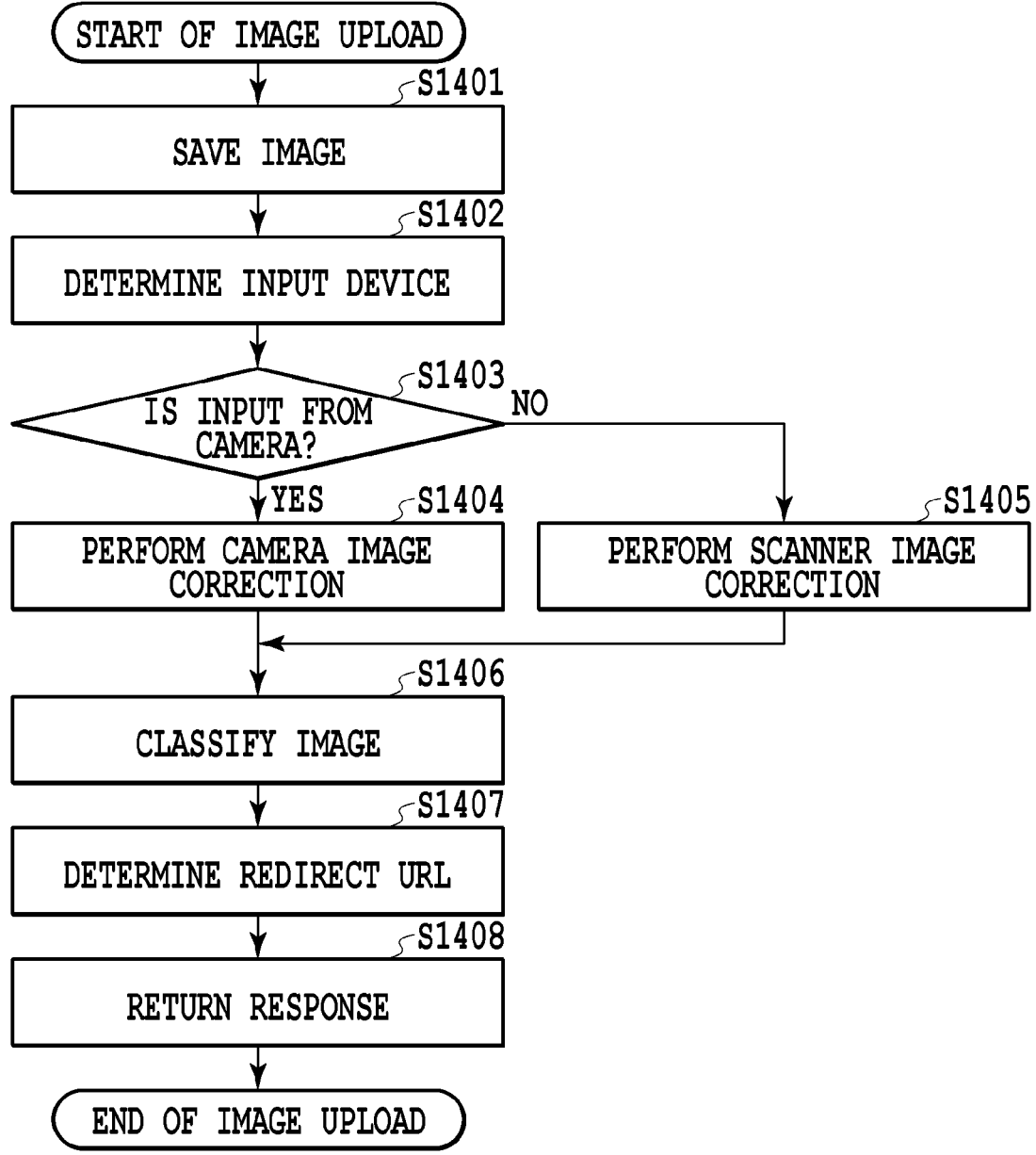
FIG. 14 is a flowchart of image update processing performed by the cloud service server according to the first embodiment.
Figure 15:
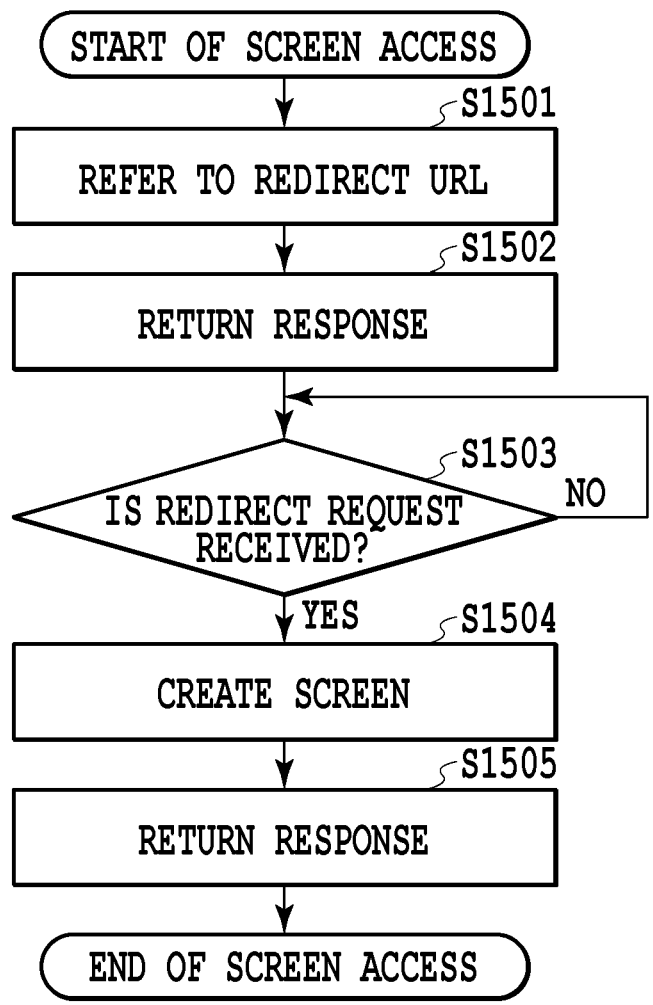
FIG. 15 is a flowchart of screen access processing performed by the cloud service server according to the first embodiment.

Next, the processing performed by the cloud service server 131 included in the system for switching screens to be displayed in accordance with the image according to the present embodiment is explained by using FIG. 13 to FIG. 15.

FIG. 13 is a flowchart of the processing performed by the cloud service server 131 according to the present embodiment.

At step S1301, the image processing application 700 is in the state of waiting for a request as the Web application. In the case where the image processing application 700 receives a request, the processing proceeds to step S1302. Until receiving a request, the image processing application 700 waits for a request.

At step S1302, the image processing application 700 acquires request URL information included in the request and determines which kind of request the received request is. Then, the processing proceeds to step S1303.

At step S1303, the image processing application 700 determines whether or not the request is an image upload request based on the determination result at step S1302. In the case where the request is an image upload request, the processing proceeds to step S1304. In the case where the request is not an image upload request, the processing proceeds to step S1305.

At step S1304, the cloud service server 131 performs image upload processing. Details of the image upload processing will be described later by using FIG. 14.

At step S1305, the image processing application 700 determines whether or not the request is a screen check request based on the determination result at step S1302. In the case where the request is a screen check request, the processing proceeds to step S1306. In the case where the request is not a screen check request, the processing proceeds to step S1307.

At step S1306, the cloud service server 131 performs screen access processing for the image check request. Details of the screen access processing will be described later by using FIG. 15.

At step S1307, the image processing application 700 determines whether or not the request is an image storage request based on the determination result at step S1302. In the case where the request is an image storage request, the processing proceeds to step S1308. In the case where the request is not an image storage request, the processing proceeds to step S1309.

At step S1308, the image processing application 700 acquires image data after image processing from the image data management unit 701 and transmits the image data to a storage destination in accordance with the image storage request. In the present embodiment, the image storage request is transmitted to the cloud storage server 132 together with the image data.

At step S1309, the cloud service server 131 determines that a request beyond expectation is received and performs processing to be performed in the case of an error. Because of having received a request beyond expectation, the image processing application 700 generates a response including the HTTP status code 400 and returns the response to the Web browser 601 of the mobile terminal 151.

FIG. 14 is a flowchart for explaining the image upload processing at step S1304 in FIG. 13.

At step S1401, the image processing application 700 acquires image data from the received image upload request and requests the image data management unit 701 to save the image data. In response to the request to save the image data from the image processing application 700, the image data management unit 701 saves the image data in the HDD 314 of the cloud service server 131. At this time, the image data management unit 701 manages the image data by giving an ID to the saved image data. Next, the processing proceeds to step S1402.

At step S1402, the image processing application 700 requests the input data determination unit 703 to determine the input device. In response to the request to determine the input device from the image processing application 700, the input data determination unit 703 determines which device has generated the image data by referring to the image data kept by the image data management unit 701. In the present embodiment, on the supposition that the image data is transmitted in the JPEG format, the device that has generated the image data is determined by extracting Exif information included in JPEG. Next, the processing proceeds to step S1403.

At step S1403, the image processing application 700 determines whether the image data is generated by a camera or a scanner based on the determination result by the input data determination unit 703. In the case where the image data is generated by a camera, the processing proceeds to step S1404. In the case where the image data is generated by a scanner, the processing proceeds to step S1405.

At step S1404, the image processing application 700 requests the image processing unit 702 to perform correction processing for a camera image. The image processing unit 702 having received the request to perform image correction processing for a camera image performs processing, such as trapezoid (keystone) correction, which is correction processing for a cameral image, on the image data kept by the image data management unit 701. Next, the image processing unit 702 requests the image data management unit 701 to keep the image data after the processing. Upon receipt of the request to keep the image data from the image processing unit 702, the image data management unit 701 keeps the image data after the image processing in the HDD 314 of the cloud service server 131. Next, the processing proceeds to step S1406.

At step S1405, the image processing application 700 requests the image processing unit 702 to perform correction processing for a scanner image. The image processing unit 702 having received the request to perform image correction processing for a scanner image performs processing, such as background removal, which is correction processing for a scanner image, on the image data kept by the image data management unit 701. Next, the image processing unit 702 requests the image data management unit 701 to keep the image data after the processing. Upon receipt of the request to keep the image data from the image processing unit 702, the image data management unit 701 saves the image data after the image processing in the HDD 314 of the cloud service server 131. Next, the processing proceeds to step 1406.

By the processing at step S1403 to step S1405, it is made possible to perform appropriate image correction processing in accordance with the input device.

At step S1406, the image processing application 700 requests the image classification unit 704 to perform image classification. The image classification unit 704 having received the request to perform image classification acquires the image data after the image processing kept by the image data management unit 701 and performs image classification processing. In the image classification processing, the image classification unit 704 calculates a degree of similarity by comparing the image data registered in advance in the image classification DB 705 and the image data after the image processing. Next, the image classification unit 704 acquires the kind of the document of the image data after the image processing from the image data whose calculated degree of similarity is highest and which is registered in advance in the image classification DB 705. It is assumed that in the image classification DB 705, the image data and the kind of document of the image data are managed in pairs. Next, the processing proceeds to step 1407.

At step S1407, the image processing application 700 requests the redirect URL determination unit 706 to perform redirect URL determination. The redirect URL determination unit 706 having received the request to perform redirect URL determination acquires a redirect URL associated with the kind of document acquired by the image classification unit 704 at step S1406. Next, the redirect URL determination unit 706 requests the image data management unit 701 to mange the acquired redirect URL and the original image data in association with each other. The image data management unit 701 having received the request from the redirect URL determination unit 706 manages the redirect URL acquired by the redirect URL determination unit 706 and the original image data in association with each other. Next, the processing proceeds to step S1408.

At step S1408, the image processing application 700 generates a response to the image upload request and responds to the scan application 500 by returning the generated response. At this time, the generated response includes ID information attached to image data by the image data management unit 701.

FIG. 15 is a flowchart for explaining the screen access processing for the screen check request at step S1306 in FIG. 13. In the present embodiment, it is assumed that the screen check request received by the image processing application 700 includes image data ID information indicative of for which image data the request is made.

At step S1501, the image processing application 700 makes an inquiry about redirect URL information managed in association with the image data having the image data ID included in the screen check request to the image data management unit 701. The image data management unit 701 having received the inquiry returns the relevant redirect URL to the image processing application 700. Next, the processing proceeds to step S1502.

At step S1502, the image processing application 700 generates a response including the redirect URL acquired from the image data management unit 701 and returns the generated response to the client. Next, the processing proceeds to step S1503.

At step S1503, the image processing application 700 is in the state of waiting for, as a Web application, a request to be redirected from the client having received the response including the redirect URL. In the case where a request is received, the processing proceeds to step S1504. Until receiving a request, the image processing application 700 waits for a request. In the present embodiment, for simplification of explanation, the image processing application 700 waits for, as a Web application, a request to be redirected from the client having received the response including the redirect URL. However, it may also be possible for the image processing application 700 to return to step S1301 once in order to treat a request and to perform the processing at step S1504 and subsequent steps for each received redirected request.

At step S1504, the image processing application 700 generates a display screen for a redirected request. As the display screen, the screen illustrated in FIG. 11 or FIG. 12 is generated in accordance with the request. Next, the processing proceeds to step S1505.

At step S1505, the image processing application 700 generates a response including the generated display screen and returns the generated response to the client.

The above is the processing performed by the cloud service server 131 in the present embodiment.

As above, according to the present embodiment, it is possible to switch the screens to be displayed in accordance with the scanned image in the case where a document is scanned and the system is accessed from the mobile terminal etc.

Second Embodiment

Next, a second embodiment of the present invention is explained. In the second embodiment, in particular, processing of the cloud service server 131 to acquire information from the cloud storage server 132 and to generate a screen to be presented to a user based on the acquired information in the configuration explained in the first embodiment is explained. To the same configurations as those in the above-described first embodiment, the same symbols are attached and detailed explanation is omitted.

Figure 16:
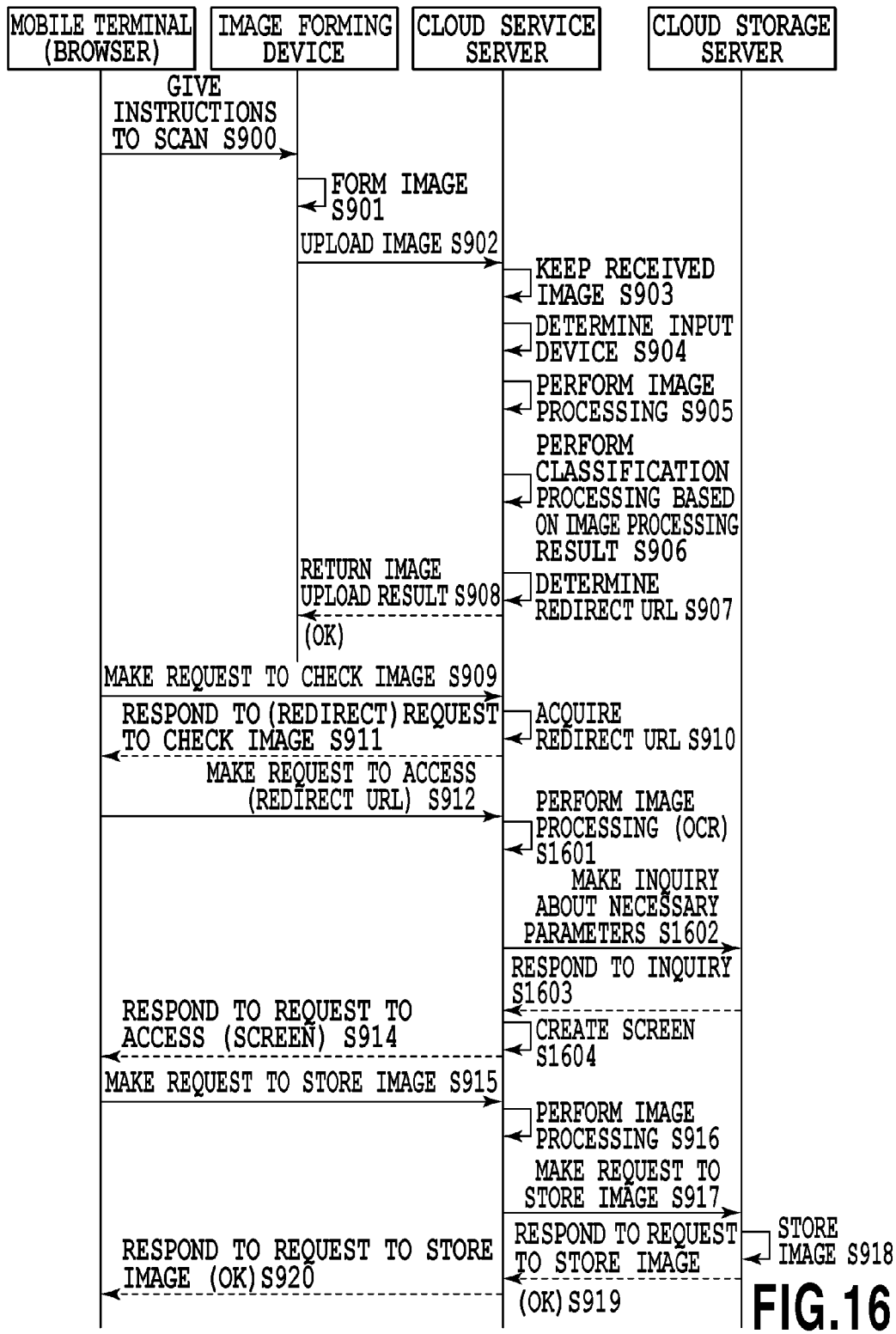
FIG. 16 is a sequence diagram of processing of a system according to a second embodiment.

FIG. 16 is a sequence diagram for explaining a flow of a series of processing performed by a system including the image forming device 101, the mobile terminal 151, the cloud service server 131, and the cloud storage server 132 in the second embodiment. Steps S900 to S912 and steps S914 to S920 have the same configurations as those in the above-described first embodiment, and therefore, detailed explanation is omitted.

At step S1601, the image processing application 700 requests the image processing unit 702 to perform OCR processing on the image data specified from information, such as the ID for specifying the image included in the image check request received at step S909. Upon receipt of the request from the image processing application 700, the image processing unit 702 specifies the target image data and performs the OCR processing. Next, the image processing unit 702 requests the image data management unit 701 to keep the text information extracted as the result of the OCR processing. Upon receipt of the request from the image processing unit 702, the image data management unit 701 saves the text information in association with the image data on which the OCR processing is performed.

At step S1602, the image processing application 700 transmits a necessary parameter inquiry request for making an inquiry about parameters necessary at the time of transmitting image data to the cloud storage server 132. Here, the parameter information refers to a file name and attribute information associated with the file.

At step S1603, the cloud storage application 800 generates a response including parameter information necessary at the time of receiving image data for the necessary parameter inquiry request from the image processing application 700 and returns the response.

At step S1604, the image processing application 700 acquires parameter information included in the response from the cloud storage application 800. Next, the image processing application 700 acquires the text information saved in association with the target image data from the image data management unit 701. Further, the image processing application 700 associates the text information with the parameter information. At this time, it is assumed that the image processing application 700 has a correspondence table for associating the text information with the parameter information as internal data. The image processing application 700 generates a screen based on the result of associating the text information with the parameter information. Due to this, for example, at the time of generating the screen as in FIG. 12, it is possible to generate a screen in the state where values are already input to items to be filled in etc. at the time of the screen generation by associating the parameter information (company name) and the text information (ABC Inc.).

As above, according to the present invention, it is possible to switch screens to be displayed in accordance with the scanned image in the case where a document is scanned and the system is accessed from the mobile terminal etc. Further, according to the present invention, it is possible to reduce the burden of inputting etc. of a user by the cloud service server 131 acquiring information from the cloud storage server 132 and generating a screen to be presented to the user based on the acquired information.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-198409, filed Sep. 25, 2013, which is hereby incorporated by reference herein in its entirety.

What is claimed is:

1. An image processing system for performing image processing on an input image, the system comprising:
at least one processor; and
a memory coupled to the at least one processor and having instructions stored thereon, which when executed by the at least one processor, cause the at least one processor to:
analyze input image data and determine a device that has input the input image data;
selectively perform image processing on the input image data based on a result of the determination;
classify the input image data by using image data on which image processing is selectively performed; and
determine a URL destination at the time of an access by a user in accordance with a result of the classification,
wherein the image data on which the image processing is selectively performed is subjected to processing in accordance with instructions from a display screen of the determined URL destination and a result of the processing is saved.

2. The image processing system according to claim 1, including a mobile terminal, an image forming device, a cloud service server, and a cloud storage server.

3. The image processing system according to claim 2, wherein the memory has further instructions stored thereon, which when executed by the at least one processor cause the at least one processor to:
at the time of generating the display screen of the determined URL destination, cause the cloud service server to generate a display screen based on a result of making an inquiry to the cloud storage server and the image data on which the selective image processing is performed.

4. The image processing system according to claim 1, wherein
the device includes a camera and a scanner.

5. The image processing system according to claim 1, wherein the memory has further instructions stored thereon, which when executed by the at least one processor cause the at least one processor to:
classify the input image data by calculating a degree of similarity of the image data on which image processing is selectively performed with image data registered in advance.

6. An image processing method in an image processing system for performing image processing on an input image, the method comprising:
analyzing input image data and determining a device that has input the input image data;
selectively performing image processing on the input image data based on a result of the determining;
classifying the input image data by using image data on which image processing is selectively performed; and
determining a URL destination at the time of an access by a user in accordance with a result of the classifying,
wherein the image data on which the image processing is selectively performed is subjected to processing in accordance with instructions from a display screen of the determined URL destination and a result of the processing is saved.

7. The image processing method according to claim 6, wherein
the image processing system includes a mobile terminal, an image forming device, a cloud service server, and a cloud storage server.

8. The image processing method according to claim 7, wherein
at the time of generating a display screen of the determined URL destination, the cloud service server generates a display screen based on a result of making an inquiry to the cloud storage server and the image data on which the selective image processing is performed.

9. The image processing method according to claim 6, wherein
the device includes a camera and a scanner.

10. The image processing method according to claim 6, wherein
the classifying includes classifying the input image data by calculating a degree of similarity of the image data on which image processing is selectively performed with image data registered in advance.

11. A non-transitory computer readable storage medium storing a program for causing a computer to:
analyze input image data and determine a device that has input the input image data;
selectively perform image processing on the input image data based on a result of the determination;
classify input image data by using image data on which image processing is selectively performed; and
determine a URL destination at the time of an access by a user in accordance with a result of the classification,
wherein the image data on which the image processing is selectively performed is subjected to processing in accordance with instructions from a display screen of the determined URL destination and a result of the processing is saved.

* * * * *